United States Patent
Seibert

(10) Patent No.: US 11,649,841 B2
(45) Date of Patent: May 16, 2023

(54) TIE ROD ASSEMBLY UNION

(71) Applicant: Federal-Mogul Motorparts LLC, Southfield, MI (US)

(72) Inventor: Trevor G. Seibert, Millstadt, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 0 days.

(21) Appl. No.: 16/574,336

(22) Filed: Sep. 18, 2019

(65) Prior Publication Data

US 2020/0086917 A1     Mar. 19, 2020

Related U.S. Application Data

(60) Provisional application No. 62/732,676, filed on Sep. 18, 2018.

(51) Int. Cl.
*F16B 7/10* (2006.01)
*F16B 2/06* (2006.01)
*F16C 7/06* (2006.01)

(52) U.S. Cl.
CPC .............. *F16B 7/105* (2013.01); *F16B 2/065* (2013.01); *F16C 7/06* (2013.01); *Y10T 403/32491* (2015.01); *Y10T 403/7067* (2015.01)

(58) Field of Classification Search
CPC .. B60G 2206/1112; F16B 2/065; F16B 7/042; F16B 7/1418; F16B 7/1472;
(Continued)

(56) References Cited

U.S. PATENT DOCUMENTS 375,398 A * 12/1887 Treacy .................... F16B 2/065
                                                              403/191
1,458,894 A * 6/1923 Schwarz ................... F16D 3/74
                                                              464/88
(Continued)

FOREIGN PATENT DOCUMENTS

CN          205806123 U      12/2016
EP           0432519 A1        6/1991
(Continued)

OTHER PUBLICATIONS

International Search Report, dated Jan. 7, 2020 (PCT/US2019/051649).

*Primary Examiner* — Josh Skroupa
(74) *Attorney, Agent, or Firm* — Robert L. Stearns; Dickinson Wright, PLLC

(57) ABSTRACT

The tie rod assembly union includes a tube sleeve and a tie rod shaft that extends into the tube sleeve such that the tie rod shaft and the tube sleeve overlap with one another. In the overlapping area, each of the tie rod shaft and the tube sleeve has at least one set of openings. A C-shaped clamp is disposed about the tube sleeve. The clamp has a curved inner surface which engages both tube sleeve halves. The clamp has a first set of apertures which are spaced outwardly from the curved inner surface and a second set of apertures which extend to the curved inner surface. A first fastener extends through the first set of apertures to tighten the clamp onto the tube sleeve. A second fastener extends through the second set of apertures and through aligned openings in the tie rod shaft and tube sleeve.

16 Claims, 3 Drawing Sheets

(58) Field of Classification Search
CPC .............. F16B 7/105; Y10T 403/32459; Y10T 403/32532; Y10T 403/7067; Y10T 403/32491; Y10T 403/5781; Y10T 403/7188; F16C 7/06
See application file for complete search history.

(56) References Cited

U.S. PATENT DOCUMENTS

| | | | | |
|---|---|---|---|---|
| 1,522,309 | A * | 1/1925 | McEwen | E21B 15/00 403/176 |
| 1,625,818 | A * | 4/1927 | McArthur | F16G 11/12 403/46 |
| 2,451,062 | A * | 10/1948 | Booth | F16B 2/065 403/290 |
| 2,584,687 | A * | 2/1952 | Fidler | B60B 35/109 74/586 |
| 3,938,822 | A * | 2/1976 | Guerriero | B60G 21/0551 280/86.758 |
| 4,902,158 | A * | 2/1990 | Broszat | B62D 7/20 403/290 |
| 5,059,053 | A * | 10/1991 | Rose | B62D 7/20 403/24 |
| 5,121,808 | A | 6/1992 | Visentini et al. | |
| 5,603,583 | A * | 2/1997 | Jackson | B60G 7/005 280/93.51 |
| 6,074,125 | A * | 6/2000 | Krawczak | B62D 7/20 280/93.51 |
| 6,474,747 | B2 * | 11/2002 | Beaulieu | F16B 7/042 30/296.1 |
| 6,565,279 | B1 * | 5/2003 | Skovronski | F16B 2/065 403/192 |
| 6,604,887 | B2 * | 8/2003 | Carreira | B62D 17/00 403/373 |
| 6,716,104 | B2 * | 4/2004 | MacDonald | F16D 3/76 403/344 |
| 2008/0145140 | A1 * | 6/2008 | Chen | B62K 19/36 403/24 |

FOREIGN PATENT DOCUMENTS

| | | |
|---|---|---|
| GB | 2357267 A | 6/2001 |
| KR | 20170030676 A * | 3/2017 |

* cited by examiner

TIE ROD ASSEMBLY UNION

CROSS-REFERENCE TO RELATED APPLICATION

The present application claims priority to U.S. Provisional Patent Application No. 62/732,676, filed Sep. 18, 2018, entitled "Tie Rod Assembly Union", the entire disclosure of which is incorporated herein by reference.

BACKGROUND OF THE INVENTION

1. Field of the Invention

The present invention is related generally to tie rod union assemblies of the type that can be used in agricultural combines. This invention may also be applied to other tie rod assemblies requiring length adjustment without use of threaded unions.

2. Related Art

FIG. 1 shows one known type of tie rod union assembly which is configured for use with an agricultural combine. The assembly includes a tube sleeve and a non-threaded tie rod shaft which is inserted into the tube sleeve. The tube sleeve and tie rod shaft are each provided with a plurality of spaced apart sets of aligned bolt openings for receiving bolts to fixedly attach these components together, thereby fixing the length of the tie rod union assembly. The assembly further includes a plurality of bolt bases, which are made as separate components from one another, from the tube sleeve, and from the tie rod shaft.

In this known tie rod union assembly, the tie rod shaft is fixedly attached with the tube sleeve by first aligning the bolt holes with one another such that the assembly has a desired length, then manually placing the bolt bases on the tube sleeve. Next, a plurality of bolts are inserted through the bolt bases, through the tube sleeve, and through the tie rod shaft, and lock nuts are tightened onto the bolts.

SUMMARY OF THE INVENTION AND ADVANTAGES

One aspect of the present invention is related to a tie rod assembly union which includes a tube sleeve and a tie rod end. The tube sleeve extends along an axis from an open first end and has at least one slot which extends in an axial direction from the open first end. The at least one slot separates a portion of the tube sleeve into two tube sleeve halves on opposite sides of the at least one slot. The tie rod end includes a tie rod shaft that extends into the open first end of the tube sleeve such that the tie rod shaft and the tube sleeve overlap with one another along an overlapping area. In the overlapping area, each of the tie rod shaft and the tube sleeve has at least one set of openings. A generally C-shaped clamp is disposed about the tube sleeve in the overlapping area. The clamp has a curved inner surface which engages both of the tube sleeve halves. The clamp has a first set of apertures which are spaced outwardly from the curved inner surface and has a second set of apertures which extend to the curved inner surface. A first fastener extends through the first set of apertures of the clamp to tighten the curved inner surface of the clamp onto the tube sleeve, thereby establishing a secure connection between the tube sleeve and the tie rod shaft. A second fastener extends through the second set of apertures of the clamp and through one set of openings of the tie rod shaft and through one set of openings of the tube sleeve.

The tie rod assembly union has been found to provide a more robust and durable connection between the tie rod shaft and the tube sleeve as compared to other known unions with little or no additional cost and can be installed more quickly.

According to another aspect of the present invention, the tie rod shaft lacks threads.

According to yet another aspect of the present invention, the clamp is made as a monolithic piece.

According to still another aspect of the present invention, the clamp has a pair of fingers which extend away from the curved inner surface and which are spaced apart from one another and wherein the first set of apertures are located in the fingers.

According to a further aspect of the present invention, the at least one slot of the tube sleeve is aligned with a gap between the spaced apart fingers such that tightening the first fastener onto the clamp partially closes the at least one slot of the tube sleeve.

According to yet a further aspect of the present invention, the first fastener has a diameter which is greater than the diameters of the openings in the tube sleeve and the tie rod shaft.

According to still a further aspect of the present invention, the tie rod shaft, the tube sleeve, and the clamp are all made of metal.

According to another aspect of the present invention, the first and second fasteners are bolts.

According to yet another aspect of the present invention, the first and second fasteners are the only fasteners which join the tie rod shaft with the tube sleeve.

Another aspect of the present invention is related to a method of making a tie rod union. The method includes the step of preparing a tube sleeve which extends along an axis from an open first end. The tube sleeve has at least one slot that extends in an axial direction from the open first end and that separates the tube sleeve into two tube sleeve halves on opposite sides of the at least one slot. The method continues with the step of inserting a tie rod shaft of a tie rod end into the open first end of the tube sleeve such that the tie rod shaft and the tube sleeve overlap with one another along an overlapping area. The method proceeds with the step of aligning a set of openings in the tie rod shaft with a set of openings in the tube sleeve. The method continues with the step of inserting a generally C-shaped clamp about the tube sleeve in the overlapping area. The C-shaped clamp has a curved inner surface which engages both of the tube sleeve halves, has a first set of apertures which are spaced outwardly from the curved inner surface, and has a second set of apertures which extend to the curved inner surface. The method proceeds with the steps of inserting a first fastener through the first set of apertures of the clamp and tightening the curved inner surface against the tube sleeve with the first fastener to establish a secure connection between the tube sleeve and the tie rod shaft. The method continues with the step of inserting a second fastener through the second set of apertures of the clamp and through the aligned openings of the tie rod shaft and the tube sleeve.

According to another aspect of the present invention, the tie rod shaft lacks threads.

According to yet another aspect of the present invention, the clamp is made as a monolithic piece.

According to still another aspect of the present invention, the C-shaped clamp includes a pair of fingers which extend away from the curved inner surface and which are spaced apart from one another by a gap and wherein the method further includes the step of aligning the gap with the at least one slot of the tube sleeve.

According to a further aspect of the present invention, the first fastener has a greater diameter than the diameters of the openings in the tube sleeve and the tie rod shaft.

According to yet a further aspect of the present invention, the tie rod shaft and the tube sleeve and the clamp are all made of metal.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figures 1, 2:
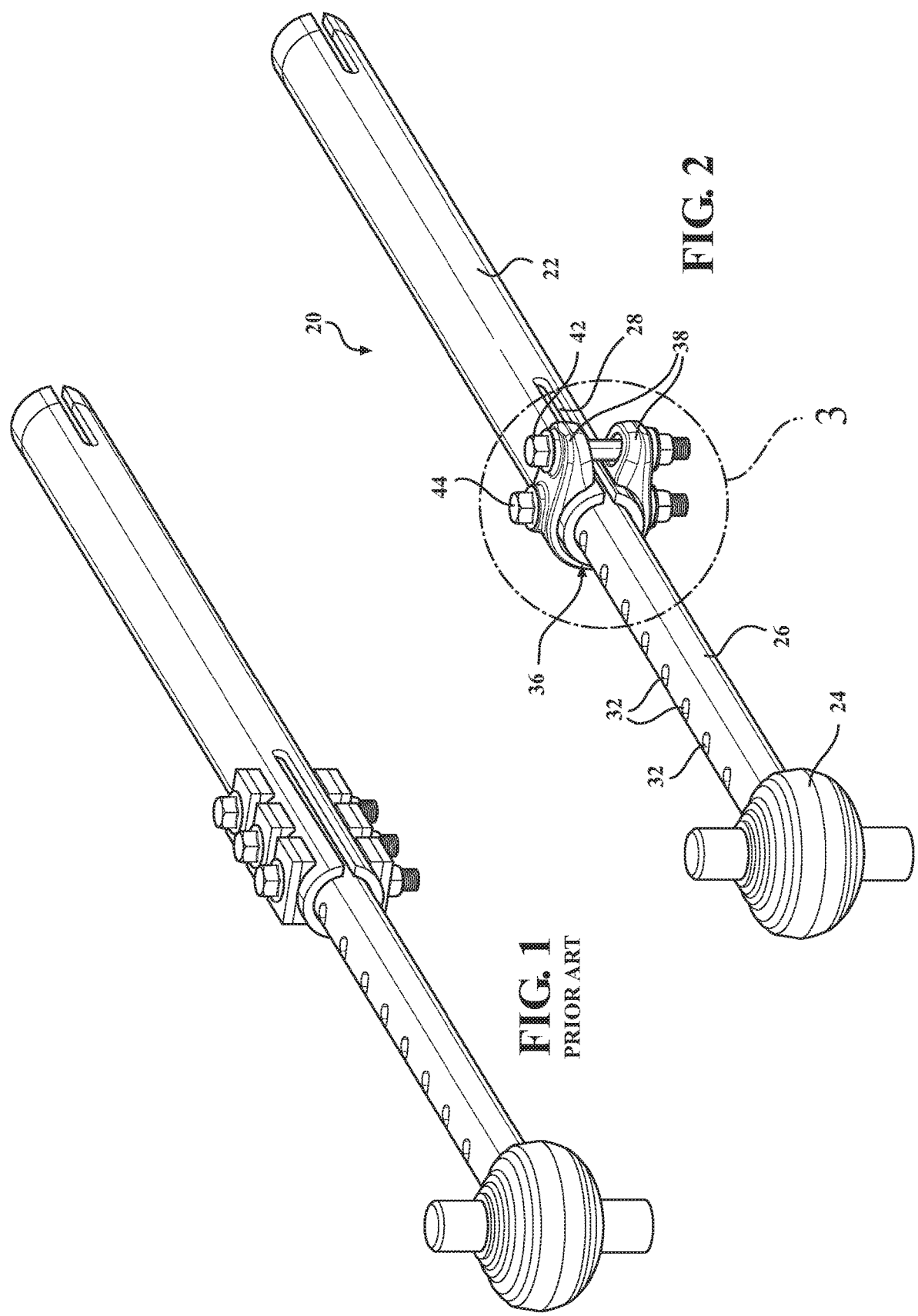
FIG. 1 is a perspective and elevation view of one known type of tie rod assembly union.
FIG. 2 is a perspective and elevation view of a tie rod union assembly which is constructed according to one aspect of the present invention.
Figure 3:
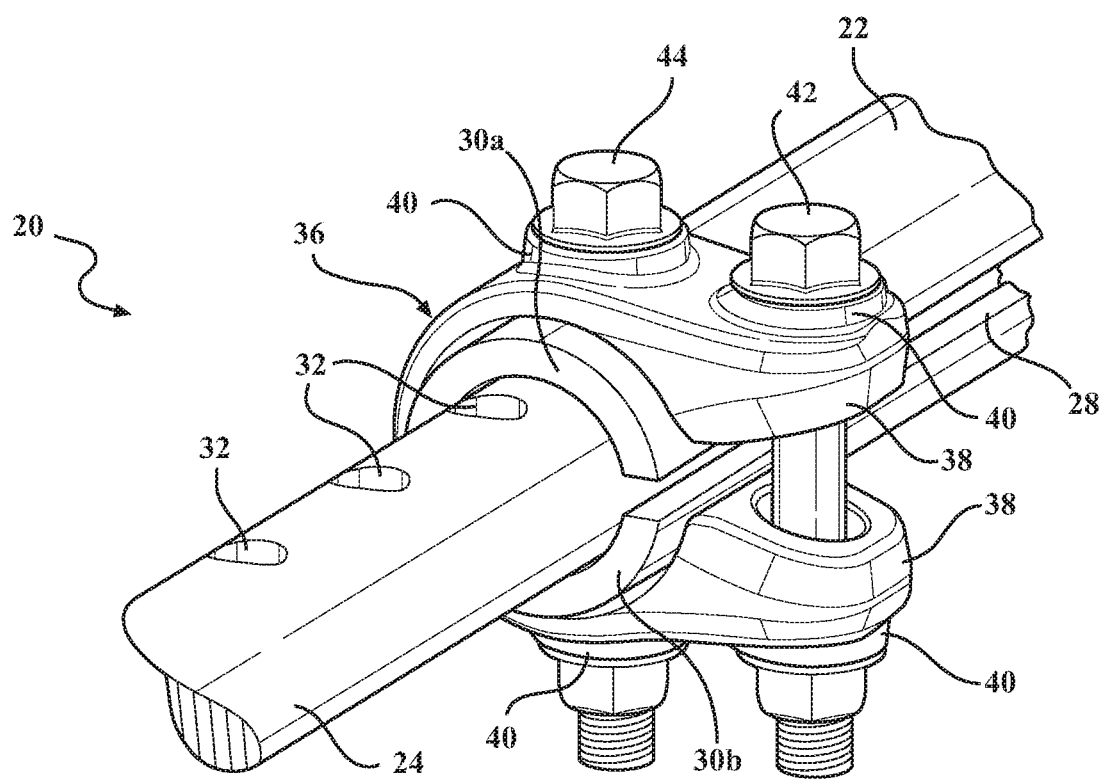
FIG. 3 is an enlarged view of a portion of the tie rod union assembly of FIG. 2.
Figure 4:
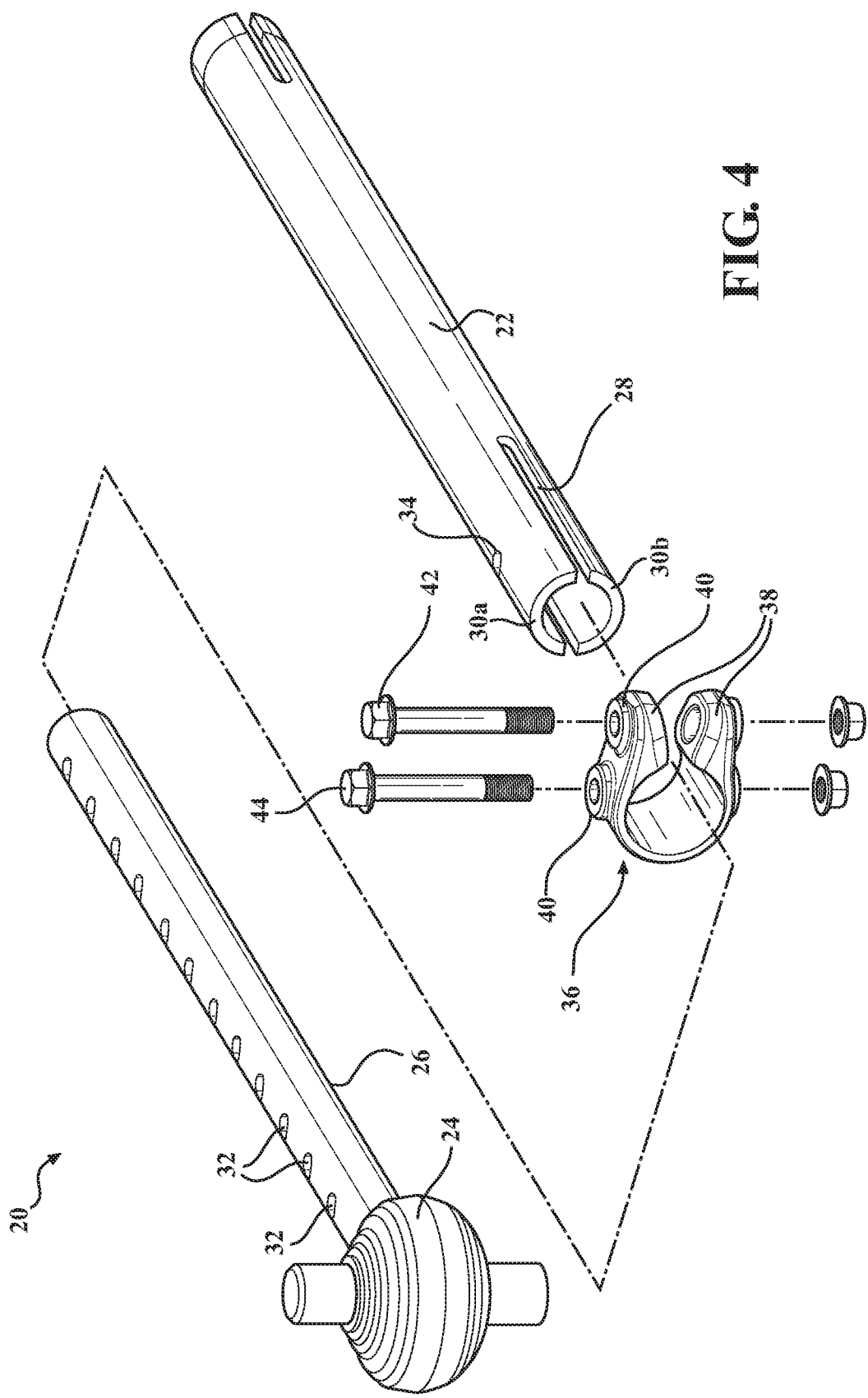
FIG. 4 is an exploded view of the tie rod union assembly of FIG. 2.

Referring to the Figures, wherein like numerals indicate corresponding parts throughout the several views, an exemplary embodiment of a tie rod assembly 20 which is constructed according to one aspect of the present invention is generally shown in FIGS. 2-4. The tie rod assembly 20 of the exemplary embodiment is specifically configured for use with agricultural combines. However, it should be appreciated that the tie rod union assembly could alternately be configured for use with other types of vehicles.

The tie rod assembly 20 includes a tube sleeve 22 and a tie rod end. The tube sleeve 22 is generally cylindrical in shape and extends along an axis from an open first end to an open second end. The tie rod end includes a joint 24 and a tie rod shaft 26 which is cylindrical in shape and extends away from the joint 24. The tie rod shaft 26 is shaped and sized to be inserted into the first open end of the tube sleeve 22 such that, in an assembled condition, the tie rod shaft 26 is partially received in the open first end of the tube sleeve 22. Thus, in an assembled condition, the tube sleeve 22 and the tie rod shaft 26 overlap with one another along an overlapping area. In the overlapping area, the tube sleeve 22 and tie rod shaft 26 are provided with cooperating length adjusting features which allow the length that the tie rod shaft 26 extends out of the tube sleeve 22 to be selected prior to fixedly attaching these components together. In other words, the length of the tie rod assembly 20 is adjustable. In contrast to other known tie rod assemblies, in the exemplary embodiment, the tie rod shaft 26 is unthreaded, and thus, the length adjustment feature is non-threaded in nature.

The tube sleeve 22 has a slot 28 which starts at the open first end and which extends axially towards the open second end. The slot 28 separates an end portion of the tube sleeve 22 into two tube sleeve halves 30a, 30b on opposite sides of the slot 28. In the exemplary embodiment, each end portion of the tube sleeve 22 has only a single slot 28. However, it should be appreciated that two or more slots could be provided.

The tie rod shaft 26 includes a plurality of bolt openings 32 which are disposed in a plurality of sets that are spaced axially from one another. The bolt openings 32 of each set are aligned with and diametrically opposed from one another. The tube sleeve 22 has a corresponding single set of bolt openings 34 which can be aligned with any of the sets of bolt openings 32 on the tie rod shaft 26 by sliding the tie rod shaft 26 further into or out of the tube sleeve 22 until alignment is achieved. The length of the tie rod assembly 20 can be selected by choosing which set of bolt openings 32 in the tie rod shaft 26 is aligned with the set of bolt openings 34 in the tube sleeve 22. The single set of bolt openings 32 of the tube sleeve 22 of the exemplary embodiment is different than other known tube sleeves which typically include multiple sets of bolt openings. Thus, the tube sleeve 22 of the exemplary embodiment can be made more quickly and cost effectively than other known tube sleeves because fewer bolt openings 34 must be formed into the tube sleeve 22.

In the overlapping area, a C-shaped clamp 36 partially wraps around the tube sleeve 22 for fixedly attaching the tube sleeve 22 and the tie rod shaft 26 in a very durable and secure manner. The clamp 36 has a curved inner surface which is in contact with the outer surfaces of both of the tube sleeve halves 30a, 30b. The clamp 36 has a pair of fingers 38 has a pair of fingers 38 which extend away from the curved inner surface and which are spaced apart from one another by a gap. The clamp 36 is oriented such that the gap between the fingers 38 is aligned with the slot 28 in the tube sleeve 22. The fingers 38 have inner faces which diverge away from one another in a direction away from the tube sleeve 22 to allow the clamp 36 to more easily be inserted onto the tube sleeve 22. The fingers 38 also have outer faces which are planar to present bolt bases 40 to provide flat surfaces for a pair of fasteners 42, 44 discussed in further detail below. The bolt bases 40 may vary in appearance based on manufacturing method or need in the application.

The fingers 38 present a first set of apertures that are co-axially aligned with one another and that receive a first fastener 42. The first set of apertures are spaced away from the curved inner surface of the clamp 36, and thus, the first fastener 42 does not extend through either the tube sleeve 22 or the tie rod shaft 26. In the exemplary embodiment, the first fastener 42 has the form of a bolt and nut. Tightening the first fastener 42 (threading the nut further onto the bolt) has the effect of partially closing the gap between the fingers 38, which in turn tightens the curved inner surface against the overlapping area of the tube sleeve 22. This tightening of the clamp 36 on the tube sleeve 22 causes the slot 28 of the tube sleeve 22 to partially close so that the tube sleeve 22 tightly engages the tie rod shaft 26 to establish the secure and durable connection between the tube sleeve 22 and the tie rod shaft 26. This configuration has been found to provide a superior clamping force from the tube sleeve 22 on the tie rod shaft 26 as compared to other known tie rod assemblies.

The clamp 36 also has a second set of apertures which are co-axially aligned with one another and which extend to the curved inner surface. A second fastener 44 extends through both of the second apertures in the clamp and through the aligned bolt openings 32, 34 in the tie rod shaft 26 and the tube sleeve 22 respectively. The second fastener 44 serves as a backup retention means in the event of failure of the primary retention means (the first fastener 42). Thus, in the exemplary embodiment, the tube sleeve 22 is secured with the tie rod shaft 26 via only two fasteners 42, 44. In addition to providing the backup retention means, the second fastener 44 provides alignment between the tube sleeve 22 and the tie rod shaft 26 and ultimately establishes the desired length of the tie rod assembly 22.

In the exemplary embodiment, when the bolts and nuts of the first and second fasteners 42, 44 are installed in the tie rod assembly 20, the heads of these bolts and the nuts directly contact the planar bolt bases 40 formed on the clamp 36.

The tube sleeve 22, tie rod shaft 26, and clamp 36 are all preferably made of metal, such as steel, an alloy steel, aluminum, or an aluminum alloy, and may be shaped through any suitable process or processes. For example, the clamp 36 is preferably cast to its final form as a single monolithic piece. The bolt openings 32, 34 are preferably formed into the tie rod shaft 26 and tube sleeve 22 respectively through either stamping or machining operations.

In the exemplary embodiment, the first fastener 42 has a greater diameter than the second fastener 44 and than the bolt openings 32, 34. Thus, bolts that can be tightened to a higher installation torque can be employed as the first fastener 42, thereby increasing the possible clamping force provide by the clamp 36 on the tube sleeve 22 and the tie rod shaft 26.

In some applications, the tie rod assembly could be provided with either multiple clamps or with a single clamp which utilizes more than two fasteners.

In use, the clamp 36 provides a very secure connection between the tube sleeve 22 and the tie rod shaft 26 by compressing the tube sleeve 22 onto an outer surface of the tie rod shaft 26 despite only including two fasteners 42, 44. This is in contrast to other known connection means which require three or more fasteners. Additionally, the tie rod assembly 20 does not require any separate piece bolt bases that are also found on other known connection means and that must be manually placed onto the tube sleeve before it can be fixedly attached with the tie rod shaft. Thus, the process for connecting the tube sleeve 22 with the tie rod shaft 26 of the exemplary tie rod assembly 20 can be accomplished more quickly, with less effort and fewer components than those other known connection means.

Another aspect of the present invention is related to a method of making a tie rod assembly 20, such as the tie rod assembly 20 shown in FIGS. 2-4 and discussed above. The method includes the steps of preparing the tube sleeve 22 and inserting an end of the tie rod shaft 26 into the open first end of the tube sleeve 22. The method continues with the step of aligning one of the sets of bolt openings 32 in the tie rod shaft with the set of bolt openings 34 in the tube sleeve 22. The method proceeds with the steps of inserting the clamp 36 about the tube sleeve 22 in the overlapping area and establishing direct contact between the curved inner surface of the clamp 26 with the outer surface of the tube sleeve 22. The method continues with the step of inserting the first fastener 42 through the first set of apertures in the clamp 36 and tightening the curved inner surface of the clamp 36 onto the tube sleeve 22 to establish the secure connection between the tube sleeve 22 and the tie rod shaft 26. The method proceeds with the step of inserting the second fastener 44 through the second set of apertures in the clamp 36 and through the aligned bolt openings 32, 34 of the tie rod shaft 26 and the tube sleeve 22 respectively. Preferably the step of inserting the second fastener 44 through the second set of apertures in the clamp 36 and through the aligned bolt openings 32, 34 of the tie rod shaft 26 occurs before inserting the first fastener 42 through the first set of apertures of the clamp 36 in order to provide alignment between the tube sleeve 22 and the tie rod shaft 26 and establish the desired length of the tie rod assembly 20 prior to tightening the clamp 36 down onto the tube sleeve 22.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A tie rod assembly union, comprising:
a tube sleeve extending along an axis from an open first end, said tube sleeve having at least one slot which extends in an axial direction from said open first end and which separates an end portion of said tube sleeve into two tube sleeve halves on opposite sides of said at least one slot;
a tie rod end including a tie rod shaft, said tie rod shaft extending into said open first end of said tube sleeve such that said tie rod shaft and said tube end portion of said tube sleeve overlap with one another along an overlapping area;
in said overlapping area, said tie rod shaft having at least one set of openings and said tube sleeve having at least one set of openings;
a generally C-shaped clamp disposed about said tube sleeve in said overlapping area, said clamp having a curved inner surface which engages both of said tube sleeve halves, said clamp having a first set of apertures which are spaced outwardly from said curved inner surface and having a second set of apertures which extend to said curved inner surface;
a first threaded bolt fastener extending through said first set of apertures of said clamp and a threaded nut engaging the first threaded bolt and tightening said curved inner surface of said clamp onto said tube sleeve to establish a secure connection between said tube sleeve and said tie rod shaft;
a second threaded bolt fastener extending through said second set of apertures of said clamp and through one set of openings of said tie rod shaft and through one set of openings of said tube sleeve and a threaded nut engaging the second threaded bolt and tightening the clamp and sleeve against the tie rod;
said clamp being made as a monolithic piece;
said clamp having a pair of fingers which extend away from said curved inner surface, said fingers being spaced apart from one another, and said first set of apertures being located in said fingers; and
said first fastener having a diameter which is greater than the diameters of said openings in said tube sleeve and said tie rod shaft.

2. The tie rod union as set forth in claim 1 wherein said tie rod shaft lacks threads.

3. The tie rod union as set forth in claim 1 wherein said at least one slot of said tube sleeve is aligned with a gap between said spaced apart fingers such that tightening said first fastener onto said clamp partially closes said at least one slot of said tube sleeve.

4. The tie rod union as set forth in claim 1 wherein said tie rod shaft and said tube sleeve and said clamp are all made of metal.

5. The tie rod union as set forth in claim 1 wherein said first and second fasteners are the only fasteners which join said tie rod shaft with said tube sleeve.

6. A method of making a tie rod union, comprising the steps of:
- preparing a tube sleeve which extends along an axis from an open first end, the tube sleeve having at least one slot that extends in an axial direction from the open first end, and the at least one slot separating the end portion of the tube sleeve into two tube sleeve halves on opposite sides of the at least one slot;
- inserting a tie rod shaft of a tie rod end into the open first end of the tube sleeve such that the tie rod shaft and the tube sleeve overlap with one another along an overlapping area;
- aligning a set of openings in the tie rod shaft with a set of openings in the tube sleeve;
- inserting a generally C-shaped clamp about the tube sleeve in the overlapping area, the C-shaped clamp having a curved inner surface which engages both of the tube sleeve halves, and the clamp having a first set of apertures which are spaced outwardly from the curved inner surface and having a second set of apertures which extend to the curved inner surface;
- inserting a second threaded bolt fastener through the second set of apertures of the clamp and through the aligned openings of the tie rod shaft and the tube sleeve and securing a threaded nut to the second fastener and tightening the clamp and tube sleeve about the tie rod;
- inserting a first threaded bolt fastener through the first set of apertures of the clamp and securing a threaded nut to the first threaded bolt and tightening the curved inner surface against the tube sleeve with the first fastener to establish a secure connection between the tube sleeve and the tie rod shaft; and
- wherein the first fastener has a greater diameter than the diameters of the openings in the tube sleeve and the tie rod shaft.

7. The method as set forth in claim 6 wherein the tie rod shaft lacks threads.

8. The method as set forth in claim 7 wherein the clamp is made as a monolithic piece.

9. The method as set forth in claim 6 wherein the C-shaped clamp includes a pair of fingers which extend away from the curved inner surface and which are spaced apart from one another by a gap and further including the step of aligning the gap with the at least one slot of the tube sleeve.

10. The method as set forth in claim 6 wherein the tie rod shaft and the tube sleeve and the clamp are all made of metal.

11. A tie rod assembly union, comprising:
- a tube sleeve extending along an axis from an open first end, said tube sleeve having at least one slot which extends in an axial direction from said open first end and which separates an end portion of said tube sleeve into two tube sleeve halves on opposite sides of said at least one slot;
- a tie rod end including a tie rod shaft, said tie rod shaft extending into said open first end of said tube sleeve such that said tie rod shaft and said tube end portion of said tube sleeve overlap with one another along an overlapping area;
- in said overlapping area, said tie rod shaft having at least one set of openings and said tube sleeve having at least one set of openings;
- a generally C-shaped clamp disposed about said tube sleeve in said overlapping area, said clamp having a curved inner surface which engages both of said tube sleeve halves, said clamp having a pair of fingers which extend away from the said curved inner surface, each finger of said pair of fingers having a wedge-shaped portion, said wedge-shaped portions of said pair of fingers extending toward each other and which are spaced apart from one another by a gap, said clamp having a first set of apertures located in said pair of fingers and having a second set of apertures which extend to said curved inner surface;
- a first threaded bolt fastener extending through said first set of apertures of said clamp and a threaded nut engaging the first threaded bolt and tightening said curved inner surface of said clamp onto said tube sleeve to establish a secure connection between said tube sleeve and said tie rod shaft; and
- a second threaded bolt fastener extending through said second set of apertures of said clamp and through one set of openings of said tie rod shaft and through one set of openings of said tube sleeve and a threaded nut engaging the second threaded bolt and tightening the clamp and sleeve against the tie rod.

12. The tie rod union as set forth in claim 11 wherein said tie rod shaft lacks threads.

13. The tie rod union as set forth in claim 11 wherein said at least one slot of said tube sleeve is aligned with a gap between said spaced apart fingers such that tightening said first fastener onto said clamp partially closes said at least one slot of said tube sleeve.

14. The tie rod union as set forth in claim 11 wherein said tie rod shaft and said tube sleeve and said clamp are all made of metal.

15. The tie rod union as set forth in claim 11 wherein said first and second fasteners are the only fasteners which join said tie rod shaft with said tube sleeve.

16. The tie rod union as set forth in claim 11 wherein said clamp is made as a monolithic piece.

* * * * *